US008473967B2

(12) United States Patent
Weiser et al.

(10) Patent No.: US 8,473,967 B2
(45) Date of Patent: Jun. 25, 2013

(54) SYSTEMS AND METHODS FOR PROVIDING A CLIENT-SIDE APPLICATION PROGRAMMING INTERFACE TO ACCESS A NETWORKED TELECOMMUNICATION RESOURCE

(75) Inventors: Reginald Weiser, Westmount (CA); Richard McGravie, Beaconsfield (CA)

(73) Assignee: Positron Telecommunication Systems, Montreal (CA)

(*) Notice: Subject to any disclaimer, the term of this patent is extended or adjusted under 35 U.S.C. 154(b) by 356 days.

(21) Appl. No.: 12/772,119

(22) Filed: Apr. 30, 2010

(65) Prior Publication Data

US 2011/0271289 A1    Nov. 3, 2011

(51) Int. Cl.
  *G06F 9/44*   (2006.01)
  *G06F 15/16*  (2006.01)

(52) U.S. Cl.
  USPC ............ 719/317; 719/328; 709/202; 709/203

(58) Field of Classification Search
  USPC ................... 719/310, 317, 328; 709/202, 203
  See application file for complete search history.

(56) References Cited

U.S. PATENT DOCUMENTS

| | | | |
|---|---|---|---|
| 6,195,694 B1 * | 2/2001 | Chen et al. | 709/220 |
| 6,236,997 B1 * | 5/2001 | Bodamer et al. | 1/1 |
| 6,437,803 B1 * | 8/2002 | Panasyuk et al. | 715/733 |
| 6,452,937 B1 | 9/2002 | Borkovic et al. | |
| 6,480,867 B1 * | 11/2002 | Kwan | 715/234 |
| 6,556,676 B1 | 4/2003 | Buchanan et al. | |
| 6,604,135 B1 * | 8/2003 | Rogers et al. | 709/217 |
| 7,213,047 B2 * | 5/2007 | Yeager et al. | 709/202 |
| 7,325,057 B2 * | 1/2008 | Cho et al. | 709/224 |
| 7,506,033 B2 * | 3/2009 | Case et al. | 709/217 |
| 7,991,840 B2 * | 8/2011 | Boyer et al. | 709/205 |
| 8,108,455 B2 * | 1/2012 | Yeager et al. | 709/202 |
| 2001/0050918 A1 | 12/2001 | Surprenant et al. | |
| 2005/0267935 A1 | 12/2005 | Gandhi et al. | |
| 2006/0227950 A1 | 10/2006 | Mielich et al. | |
| 2007/0019632 A1 | 1/2007 | Strathmeyer et al. | |
| 2007/0174410 A1 * | 7/2007 | Croft et al. | 709/208 |
| 2008/0084989 A1 | 4/2008 | Dhanakshirur | |
| 2010/0057921 A1 | 3/2010 | Zhang et al. | |

OTHER PUBLICATIONS

International Search Report completed Sep. 29, 2011 and mailed Nov. 22, 2011 in PCT Application No. PCT/IB2011/001369.
International Preliminary Report on Patentability completed Nov. 6, 2012 in PCT Application No. PCT/IB2011/001369.
Written Opinion of the International Seraching Authurity completed Oct. 31, 2012 in PCT Application No. PCT/IB2011/001369.

* cited by examiner

*Primary Examiner* — Van Nguyen
(74) *Attorney, Agent, or Firm* — Foley & Lardner LLP; Christopher J. McKenna

(57) ABSTRACT

The present application is directed towards systems and methods for interfacing a network-agnostic application to a networked telecommunication resource. An agent executing on a client receives a request from an application in the form of an API function call and establishes a connection to a networked telecommunications resource. The agent handles network processing of the request, a response or responses, and asynchronous events, and translates them into corresponding API callbacks for use by the application.

21 Claims, 11 Drawing Sheets

SYSTEMS AND METHODS FOR PROVIDING A CLIENT-SIDE APPLICATION PROGRAMMING INTERFACE TO ACCESS A NETWORKED TELECOMMUNICATION RESOURCE

FIELD OF THE INVENTION

The present application generally relates to telecommunications networks. In particular, the present application relates to systems and methods for interfacing a network-agnostic application to a networked telecommunication resource.

BACKGROUND OF THE INVENTION

Business and Personal communications are diversifying away from the traditional phone-to-phone call model, and are instead being replaced by multi-user communications such as conference calls, video conference calls, fax being delivered by email, voice being communicated over Session Initiation Protocol (SIP) or Voice over Internet Protocol (VoIP) and other new tools. While these different technologies and applications all converge on the user's PC, the systems used to deliver and control these applications are different. There have been no simple and standard systems that application developers may use to create an application which will unite the command, control and communication over a single API interface.

BRIEF SUMMARY OF THE INVENTION

The present application is directed towards systems and methods for interfacing a network-agnostic application to a networked telecommunication resource. An agent executing on a client receives a request from an application in the form of an API function call and establishes a connection to a networked telecommunications resource. The agent handles network processing of the request, a response or responses, and asynchronous events, and translates them into corresponding API callbacks for use by the application.

In one aspect, the present application features a method for providing a client-side application programming interface to access a networked telecommunication resource. The method includes an agent executing on a client device receiving, via a local application interface call from a client application, a request to perform a function via a telecommunication resource. The method also includes the client agent establishing a transport layer connection via a network to the remote device identified by the agent as providing the telecommunication resource. The method further includes the client agent generating an application message corresponding to the local application interface call. The method also includes the client agent transmitting the application message over the transport layer connection via the network to the remote device. The method also includes the client agent receiving a response to the application message via the network from the telecommunication resource of the remote device. The method further includes the client agent returning a result to the local application interface call based on the response.

In some embodiments, the method includes the client agent receiving a local API call from a client application that is not network aware. In other embodiments, the method includes the client agent determining a network identifier for the telecommunication resource identified by the local application interface call.

In some embodiments, the method includes the client agent generating for the application message an ASCII message from parameters of the local API call. In other embodiments, the method includes the client agent encrypting the application message.

In one embodiment, the method includes the client agent transmitting the application message via a telecommunications protocol over the transport layer connection to the remote device. In another embodiment, the method includes the client agent parsing an application layer payload of the response to extract parameters. In still another embodiment, the method includes the client agent decompressing an application layer payload of the response.

In some embodiments, the method includes the client agent determining from content of an application layer payload of the response the result to return to the local API call. In other embodiments, the method includes the client agent receiving an event via application layer data from one or more packets transmitted by the remote device to the agent. In still other embodiments, the method includes the client agent transmitting the application message and receiving the response via the network transparently to the client application.

In another aspect, the present application features a system for providing a client-side application programming interface to a telecommunication. The system includes an agent executing on a client device receiving via a local application interface call from a client application a request to perform a function via a telecommunication resource. The system also includes a formatter of the agent formatting an application message corresponding to the local application interface call. The system further includes a communications manager of the agent establishing a transport layer connection via a network to the remote device identified by the agent as providing the telecommunication resource and transmitting the application message over the transport layer connection via the network to the remote device, and wherein the communications manager receives a response to the application message via the network from the telecommunication resource of the remote device. The system also includes a parser of the agent parses the response received from the communication manager, and wherein the agent returns a result to the local application interface call based on the parsed response.

In one embodiment, the system includes the agent, responsive to a plurality of local API calls and transparently to the client application, transmitting requests to one or more telecommunication resources over the network and receiving responses over the network from the one or more telecommunication resources. In another embodiment, the system includes the communications manager determining a network identifier for the telecommunication resource identified for the local application interface call. In still another embodiment, the system includes the formatter generating for the application message an ASCII message from parameters of the local API call.

In another embodiment, the system includes an encryptor of the agent encrypting the application message. In still another embodiment, the system includes a protocol manager transmitting via the communications manager the application message via a telecommunications protocol over the transport layer connection to the remote device. In yet another embodiment, the system includes the parser parsing an application layer payload of the response to extract parameters. In still another embodiment, the system includes a decryptor decompressing an application layer payload of the response.

In some embodiments, the system includes a protocol manager determining from content of an application layer payload of the response the result to return to the local API call. In other embodiments, the system includes an events manager receiving from the communications manager an event via application layer data of one or more packets transmitted by the remote device and responsive to the event, the events manager executing one or more callbacks registered for the event.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
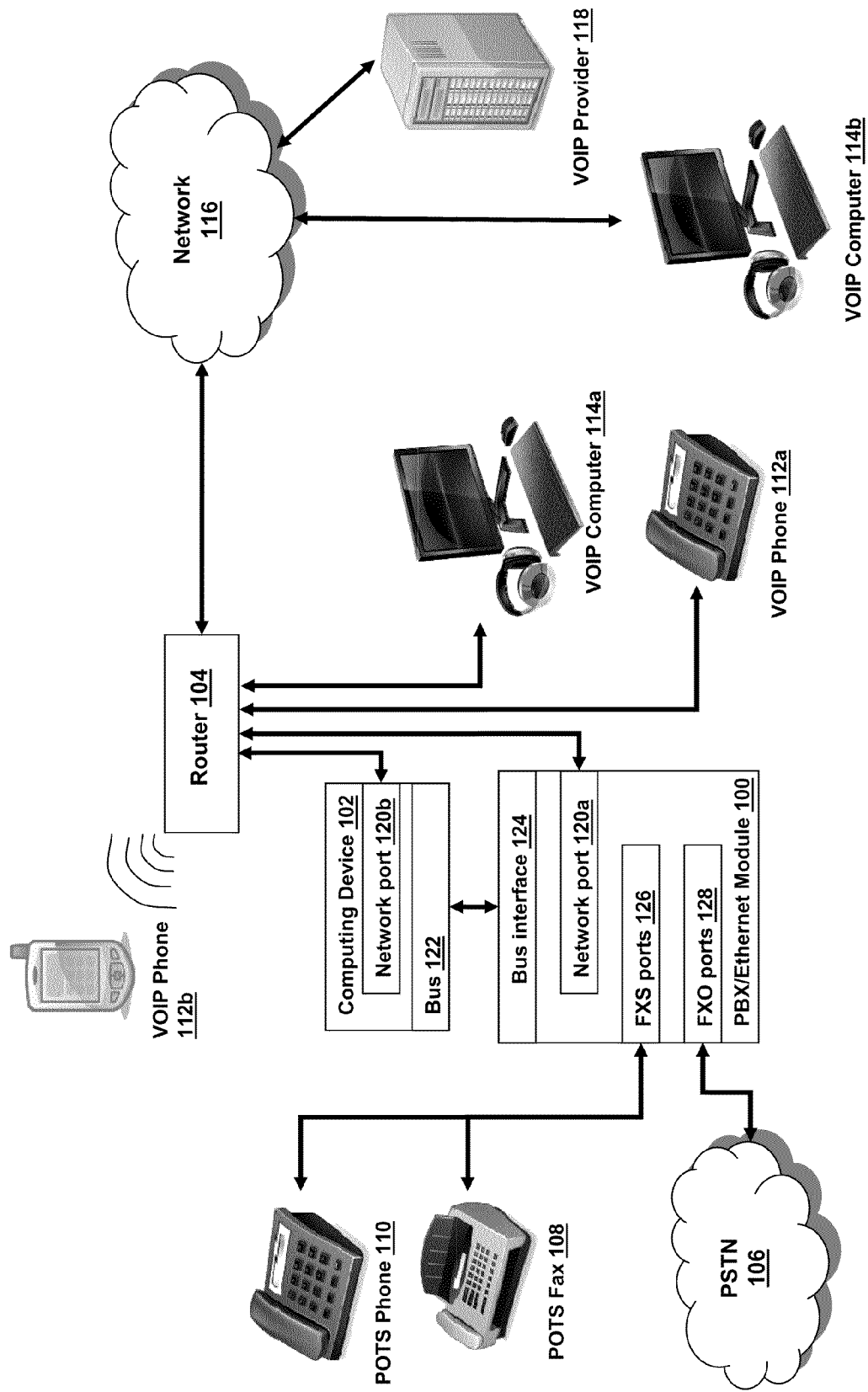
FIG. 1A is a block diagram of an embodiment of a mixed switched and IP telecommunications environment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Prior to discussing the specifics of embodiments of the systems and methods of the present solution, it may be helpful to discuss the network and computing environments in which such embodiments may be deployed. Shown in FIG. 1A is a block diagram of an embodiment of a mixed switched and IP telecommunications environment. In brief overview, a PBX/Ethernet module 100 interfaces with a switched network such as a public switched telephone network (PSTN) 106 via a foreign exchange office (FXO) port or ports 128. The PBX/Ethernet module 100 also interfaces with switched telecommunications devices, including a post office telephone service (POTS, also referred to as a post office telephone system or a plain old telephone system) fax machine 108, and a POTS phone 110, via a foreign exchange service (FXS) port or ports 126. The PBX/Ethernet module 100 also interfaces with a computing device 102 via a bus interface 124 to a bus 122. The PBX/Ethernet module and computing device 102 interface with an Ethernet network via a router 104, to communicate with devices and networks including voice-over-internet-protocol (VOIP) phones 112a and 112b (which may connect wirelessly to a wireless router 104), VOIP computers 114a and 114b, a network 116, and a VOIP provider 118. Although FIG. 1A shows a network 106 between the VOIP provider 118 and VOIP computer 114b and router 104, in some embodiments, the VOIP provider 118 and VOIP computer 114b may be on the same network as router 104. In some embodiments, devices connected to router 104, such as VOIP phones 112a and 112b, computing device 102, PBX/Ethernet module 100, and VOIP computer 114 may be referred to as comprising a local area network (LAN) or a private area network. Although not illustrated, in some embodiments, one or more additional network segments may exist between devices, phones, and computers connected to router 104.

Still referring to FIG. 1A and in more detail, in some embodiments, a PBX/Ethernet module 100 may comprise one or more network ports 120a, one or more FXS ports 126, and one or more FXO ports 128. The PBX/Ethernet module 100 may also include a bus interface 124 for interfacing with a computing device 102. In many embodiments, a PBX/Ethernet module 100 serves as an interface between a switched network, such as a PSTN network 106 and a packet network, such as a private area network or local area network via a hardware interface such as Ethernet. In many embodiments, a PBX/Ethernet module 100 may also serve as a controller for a private branch exchange (PBX) network. PBX/Ethernet module 100 is also described in more detail below in connection with FIG. 1B.

A computing device 102 may comprise a client, a workstation, a server, a blade server, an appliance, or any other computing device that comprises a bus 122 capable of interacting with a bus interface 124 of a PBX/Ethernet module 100. In many embodiments, a computing device 102 may supply power to a PBX/Ethernet module 100 via bus 122 and bus interface 124. For example, in one embodiment in which bus 122 is a PCI bus and bus interface 124 is a PCI interface, a computing device 102 may supply power to PBX/Ethernet module 100 from a power supply unit of computing device 102 via the bus. In some embodiments, bus 122 and bus interface 124 may comprise an VESA VL bus, an ISA bus, an EISA bus, a MicroChannel Architecture (MCA) bus, a PCI bus, a PCI-X bus, a PCI-Express bus, a NuBus, or any similar bus capable of carrying power to PBX/Ethernet module 100. In many embodiments, bus 122 and bus interface 124 may allow communication between computing device 102 and PBX/Ethernet module 100, as described in more detail below.

In some embodiments, router 104 may comprise a router, a switch, a network hub, a wireless router, a LAN management appliance, a network address translator, a gateway, multi-port firewall, or any other type of computing or network device for routing data packets amongst a plurality of computing devices, IP phones, or other network devices or segments. Router 104 may connect to various devices via Ethernet, firewire, or other hardware interfaces, or via wireless interfaces, such as 802.11a, 802.11b, 802.11g, 802.11n, Wimax, or any other wireless or RF interface. In some embodiments, router 104 may connect to a PBX/Ethernet module 100 via a network port 120a and/or a computing device 102 via a network port 120b. Network ports 120a and 120b may comprise Ethernet or firewire ports or other hardware interfaces, or wireless transmitters and receivers capable of interfacing with a wireless interface of router 104.

In some embodiments, PSTN 106 may comprise any type and form of a public switched telephone network, or connection thereto, or other circuit switched network provided by a telephone company or other service provider. Connection from PSTN 106 to PBX/Ethernet module 100 may be via one or more FXO ports 128, and may be via analog or digital interfaces, including POTS trunk lines, ISDN, T1, E1, or any other interface for connecting one or more PSTN trunks to a private branch exchange switch. In some embodiments, POTS devices, such as a POTS fax machine 108 or a POTS phone 110 may connect via a foreign exchange service (FXS) port or ports 126 on PBX/Ethernet module 100 to the PSTN network 106.

In some embodiments, a voice-over-IP (VOIP) provider 118 may provide VOIP services to one or more components of the system, including VOIP computers 114*a* and 114*b*, a wired VOIP phone 112*a*, and a wireless VOIP phone 112*b*. In many embodiments, VOIP provider 118 interfaces with these components via a network 116, which may be a wide area network, including the Internet, a metropolitan area network, a public network, a private network, a virtual private network, or any other type and form of network. In some embodiments, VOIP provider 118 may be located on a local area network or private network and connected directly to router 104. VOIP provider 118 may provide voice and/or video routing, incoming call signaling, outgoing call dialing, encryption, conference calling, voice mail, and other VOIP features to VOIP phones 112 and VOIP computers 114 running software VOIP interfaces.

Figure 1B:
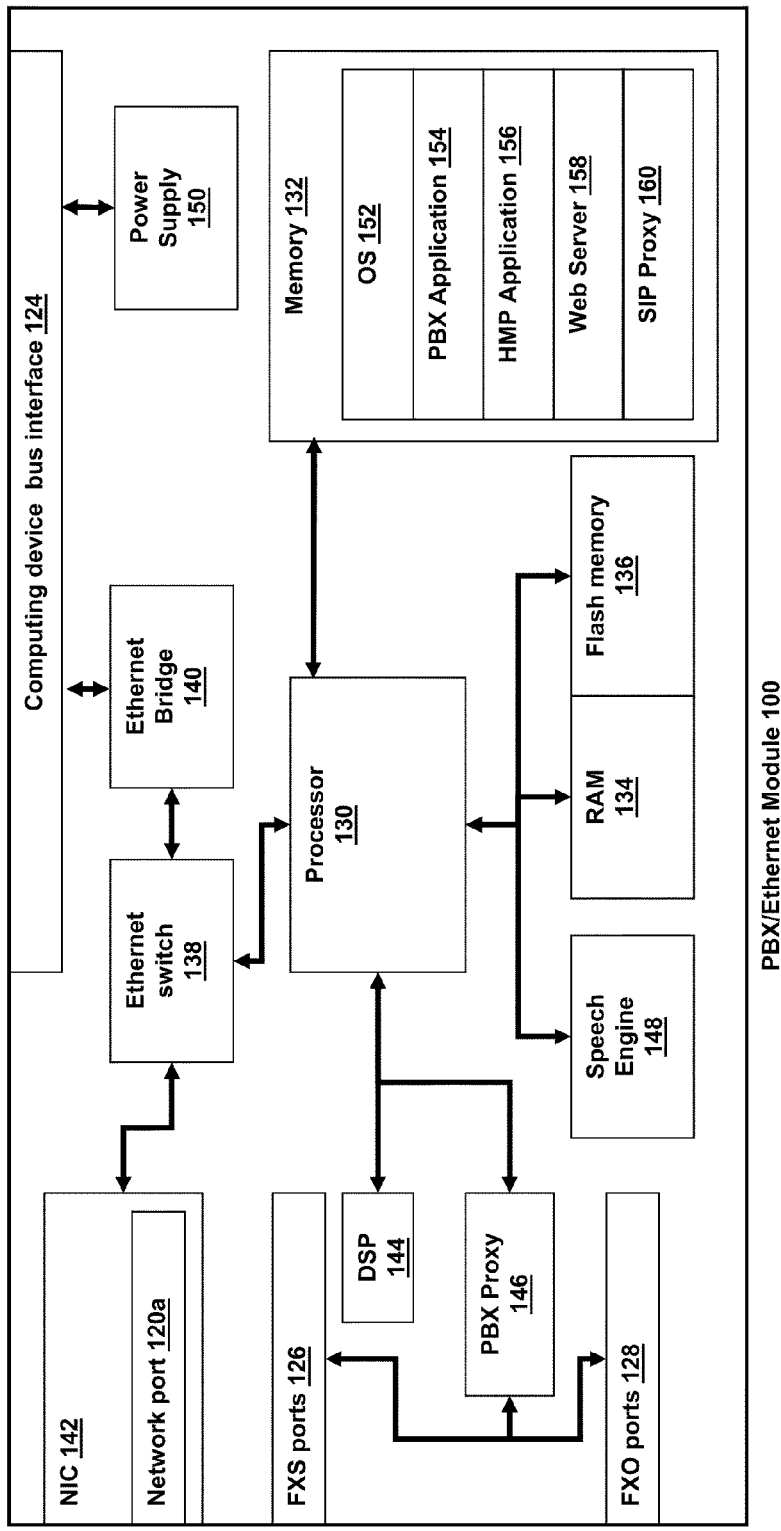
FIG. 1B is a block diagram of an embodiment of an interface module for a mixed switched and IP telecommunications environment.

Referring now to FIG. 1B, illustrated is a block diagram of an embodiment of a PBX/Ethernet device, also referred to as module 100. In brief overview, in some embodiments, a PBX/Ethernet module 100 may comprise a processor 130, a memory element 132, a random access memory element 134, a flash memory interface or element 136, an Ethernet switch 138, an Ethernet bridge 140, and a network interface card 142. In some embodiments, PBX/Ethernet module 100 may also comprise a digital signal processor 144 and/or a private branch exchange proxy 146. PBX/Ethernet module 100 may also comprise FXS ports 126 and FXO ports 128, discussed above in connection with FIG. 1A. In many embodiments, PBX/Ethernet module 100 may comprise a speech engine 148. In some embodiments, PBX/Ethernet module 100 may comprise a power supply 150, connected to a bus interface 124.

As shown, a PBX/Ethernet module 100 may comprise interfaces for both a packet-based network, such as Ethernet switch 138, Ethernet bridge 140, and NIC 142; and a circuit-switched network, such as FXS ports 126, FXO ports 128, and PBX proxy 146. In some embodiments, a PBX/Ethernet module 100 serves as a bridge or interface between these two networks, allowing interoperability and flexibility of deployment. In many embodiments, PBX/Ethernet module 100 operates in a stand-alone fashion, executing an operating system 152 and applications 154-160 on processor 130, using power supplied via the bus interface 124 from a computing device 102, and distributed via an on-board power supply 150. By including a processor, memory, and operating system independent of those of computing device 102, PBX/Ethernet module 100 has enhanced reliability and stability, requiring, in some embodiments, only power from computing device 102. In other embodiments, an external power supply may be connected to PBX/Ethernet module 100, such that computing device 102 is not necessary for operation.

Still referring to FIG. 1B and in more detail, in some embodiments, a PBX/Ethernet module 100 may comprise a processor 130, which may be referred to as a central processing unit or CPU, a processor, a microprocessor, or any similar notation. Processor 130 may comprise any type and form of processing unit, including: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif.; or any other processor capable of executing the functions described herein.

Although much of the functionality described in more detail below, such as an HMP application 156, a speech engine 148, a PBX Proxy 146, etc., are recited as being executed or performed by processor 130, in many embodiments, a co-processor, not illustrated, may execute or perform part or all of these functions, to off-load processing from the primary processor 130. Similarly, in some embodiments, functions described as being executed or performed by a co-processor may be executed or performed by processor 130. Furthermore, in some embodiments, processor 130 may comprise a multi-core processor or may comprise multiple processors collectively referred to as processor 130. Thus, one skilled in the art may readily appreciate that one or more processors and/or co-processors may perform or execute any of the functionality described herein.

In some embodiments, processor 130 may be connected via one or more internal busses to a memory element 132 and random access memory 134. Memory element 132 may comprise flash memory, a hard drive, or any other data storage element capable of storing data in a manner accessible and editable by processor 130. Memory 132 may comprise one or more of an operating system 152, a PBX application 154, a host media processing (HMP) application 156, a web server 158, and a session initiation protocol (SIP) proxy 160. RAM 134 may comprise one or more memory chips capable of storing data and allowing any storage location to be directly accessed by processor 130, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In some embodiments, RAM 134 may comprise a cache memory.

In some embodiments, a PBX/Ethernet module 100 may include a flash memory interface 136. The flash memory interface 126 may comprise and type and form of interface constructed and designed for receiving, accessing or reading flash memory media or devices, such as a the common flash memory interface (CFI). In many embodiments, flash memory interface 136 may be used for loading new operating systems 152 or applications 154-160 onto a PBX/Ethernet module 100. For example, a user may insert a flash memory card into interface 136 and restart the PBX/Ethernet module 100, triggering an initialization sequent to load new software from the flash memory card.

A network interface card or NIC 142 may comprise one or more network ports 120*a*, as discussed above in connection with FIG. 1A. In many embodiments, a NIC 142 serves as an Ethernet network interface for PBX/Ethernet module 100. The NIC 142 can in some embodiments be any of the network interface cards or mechanisms described herein. The NIC 552 can have any number of ports. The NIC may be designed and constructed to connect to any type and form of network or router 104. While a single NIC 142 is illustrated, the PBX/Ethernet module 100 may comprise any number of NICs 142.

The NIC 142 may, in some embodiments, interact with an Ethernet switch 138. Ethernet switch 138 may comprise any combination of hardware and software elements for routing communications between a NIC 142, a processor 130, and an Ethernet bridge 140. For example, a PBX/Ethernet module 100 may receive communications from a computing device 102 via a bus interface 124, as discussed above. In some instances, these communications may be directed to processor 130, such as control or configuration commands for any of applications 154-160. In other instances, these communications may be directed outward to a network, via NIC 142. Similarly, incoming communications from a network via NIC 142 may be directed to processor 130, or to a computing device 102 via the bus interface 124. Thus, the functions of Ethernet switch 138 allows the PBX/Ethernet module 100 to serve as a NIC for both applications of PBX/Ethernet module 100 and for computing device 102.

In some embodiments, an Ethernet bridge 140 serves to bridge a layer 2 network from Ethernet switch 138 to a computing device 102 via bus interface 124. An Ethernet bridge 140 may comprise any combination of hardware and software elements for connecting and managing network segments at the data link layer. In many embodiments, Ethernet bridge 140 further includes functionality to appear as a NIC or virtual NIC to computing device 102. For example, in some embodiments, upon installation of a PBX/Ethernet module 100 into a computing device 102, Ethernet bridge 140 may appear as an installed NIC or Ethernet adapter to computing device 102, such that applications and protocols above the link layer may communicate via the PBX/Ethernet module 100. In some embodiments, no additional software drivers need be installed on computing device 102 to allow for Ethernet communications via PBX/Ethernet module 100. In one embodiment, an Ethernet switch 138 and/or Ethernet bridge 140 provide network address translation or port forwarding and provide distinct network addresses to one or more components of the PBX/Ethernet module 100, including a web server 158, HMP application 156, PBX application 154, speech engine 148, PBX proxy 147, SIP proxy 160, or any other component. In a further embodiment, Ethernet switch 138 and/or Ethernet bridge 140 provide a distinct network address to a host computing device 102 via a bus interface 124. In one such embodiment, PBX/Ethernet module 100 may be installed as an Ethernet adapter on computing device 102 and direct communications to a first IP and port to computing device 102, and communications to a second IP and port to components of PBX/Ethernet module 100. For example, PBX/Ethernet module 100 may direct communications to IP 1.2.3.4 to a host computing device 102 via the bus interface 124, and direct communications to IP 1.2.3.5 to web server 158 executing on processor 130.

In some embodiments, as discussed above, PBX/Ethernet module 100 may be installed and configured to appear to be an Ethernet adapter to a computing device 102 via the bus interface 124. Accordingly, in many of these embodiments, an operating system of computing device 102 may direct network communications of applications executing on computing device 102 to PBX/Ethernet module 100.

Furthermore, in some such embodiments, a virtual operating system or virtual machine executing on computing device 102 may direct network communications of virtualized applications to PBX/Ethernet module 100. Such virtual operating systems or virtual machines may include a VMware virtual machine, using software provided by VMware, Inc. of Palo Alto, Calif.; a Xen virtual machine, using software provided by XenSource, Inc. or various open-source developers; a Windows Virtual PC, Virtual Server, or Microsoft Hyper-V Server, using software provided by Microsoft Corp. of Redmond, Wash.; a XenDesktop virtual machine, using software provided by Citrix Systems, Inc. of Fort Lauderdale, Fla.; a Parallels virtual machine, using software provided by Parallels, Inc. of Schaffhausen, Switzerland; a Java or Perl virtual machine; or any other type and form of virtual operating system or virtual machine. Because the PBX/Ethernet module 100 may be visible as an Ethernet adapter to an application executing within a virtual machine or virtual operating system, said virtualized application may direct SIP traffic to SIP, PBX, HMP, and other applications of the PBX/Ethernet module 100 without requiring specialized driver/hardware installation for the virtual machine.

Processor 130 may also, in some embodiments, operatively connect to a digital signal processor or DSP 144. DSP 144 may comprise hardware, software, or any combination of hardware and software for processing audio signals communicated over a switched telephone network. DSP 144 may comprise functionality for analog/digital signal conversion, arithmetic processing, hardware pipelining, or any other functionality useful in audio processing. In some embodiments, DSP 144 may act as an echo canceller or hybrid echo suppressor. In many embodiments, DSP 144 provides functionality to a PBX system provided by PBX proxy 146, described below, such as fax and modem operations, voice transcoding, voice enhancement, noise reduction, noise shaping, packet loss concealment, audio compression, expansion, and gating, equalization, audio mixing, conferencing, and other features.

In some embodiments, PBX/Ethernet module 100 may comprise a PBX proxy 146. PBX proxy 146 may comprise hardware and/or software components for providing a full function private branch exchange telephone system to one or more foreign exchange stations via FXS ports 126 and PSTN trunk lines via FXO ports 128. In some embodiments, PBX proxy 146 may be controlled or configured by processor 130 executing a PBX application 154. Although not illustrated, in many embodiments, PBX proxy 146 is executed by a co-processor, to off-load processing from processor 130. PBX proxy 146, along with DSP 144 and PBX application 154, may provide PBX features to telephones connected to FXS ports 126, including voice mail, music on hold, teleconferencing, intercom functionality, caller ID, direct dial, or other functions useful to users of a private branch exchange.

In many embodiments, PBX/Ethernet module 100 comprises a speech engine 148. Speech engine 148 may comprise any combination of hardware and software for voice recognition, speech-to-text processing, and text-to-speech processing. For example, in one embodiment, speech engine 148 provides a voice menu system for incoming calls from PSTN network 106, with voice recognition to allow for selection of menu items and routing of the incoming calls.

PBX/Ethernet module 100 may comprise a power supply 150. In many embodiments, power supply 150 receives power from a host computing device 102 via a bus interface 124. In some embodiments, power supply 150 may convert these voltages to desired voltages for processor 130 or other components. For example, a PBX/Ethernet module 100 using a PCI interface may receive voltages provided by a power supply unit of computing device 102 via a backplane, including +3.3V or +5V, and power supply 150 may convert these voltages as desired, such as to +1.8V for low power flash RAM cards. Power supply 150 may further comprise functionality for dynamic voltage scaling for power management.

In some embodiments, power supply 150 may include additional components to allow conversion of AC voltages to desired DC levels. In such embodiments, a PBX/Ethernet module 100 may not require a host computing device 102 for operation.

PBX/Ethernet module 100 may execute an operating system 152. In some embodiments, operating system 152 may be a desktop or server operating system, including any of the Windows variants manufactured by Microsoft Corp. of Redmond, Wash.; Unix, or a Unix-like operating system, including Gnu, Linux, or BSD; or a proprietary system, such as HP-UX, manufactured by Hewlett-Packard of Palo Alto, Calif., or AIX, manufactured by IBM of Armonk, N.Y. In some embodiments, the operating system 153 may be a firmware based or embedded operating system. In other embodiments, the PBX/Ethernet module may include any elements or combination of element of a computing device described below.

In some embodiments, PBX/Ethernet module 100 may execute any type and form of application, such as any one of several applications, including a PBX application 154, an HMP application 156, a web server 158, and a SIP proxy 160. In some embodiments, a PBX application 154 may provide configuration and functionality for the various functions of PBX proxy 146, speech engine 148, and DSP 144 discussed above. In some embodiments, an HMP application 156 may provide configuration and functionality for host media processing, including transcoding, vocoding, compression, buffering, automatic gain control and volume control, time-scale modification, and other signal processing functionality.

In many embodiments, processor 130 may execute a web server 158. The web server 158 may serve web pages to a user of computing device 102 or another computer that can access PBX/Ethernet module 100 through a network, for the purpose of configuration, diagnostics, monitoring, and maintenance of various functions of PBX/Ethernet module 100.

In some embodiments, processor 130 may execute a session initiation protocol (SIP) proxy 160. SIP proxy 160 may comprise a SIP proxy server for performing the functionality of routing SIP requests between a plurality of clients. In many embodiments, SIP proxy 160 may comprise a SIP registrar and/or a redirect server for directing SIP session invitations to external domains. For example, SIP proxy 160 may provide location services registering one or more IP addresses to a SIP uniform resource identifier (URI). In some embodiments, SIP proxy 160 may comprise a user agent server and/or user age client for managing an SIP session or transaction. In many embodiments, SIP proxy 160 may comprise a media proxy for managing audio and/or video communications via a real-time transport protocol (RTP) and/or RTP control protocol (RTCP). In some embodiments, SIP proxy 160 may be executed by a second processor 130 or a co-processor, not illustrated.

Figure 1C:
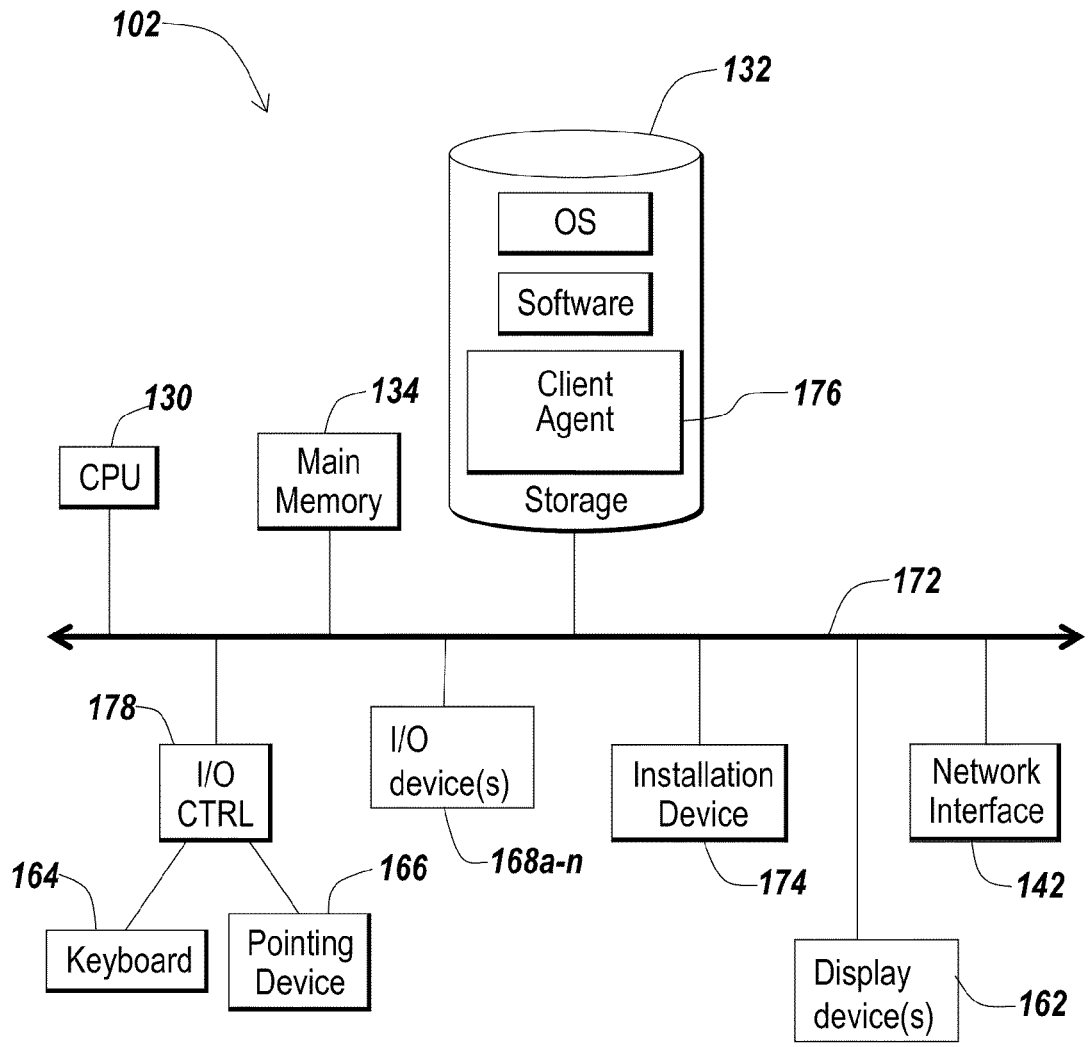
FIGS. 1C-1D are block diagrams of embodiments of a computing device.
Figure 1D:
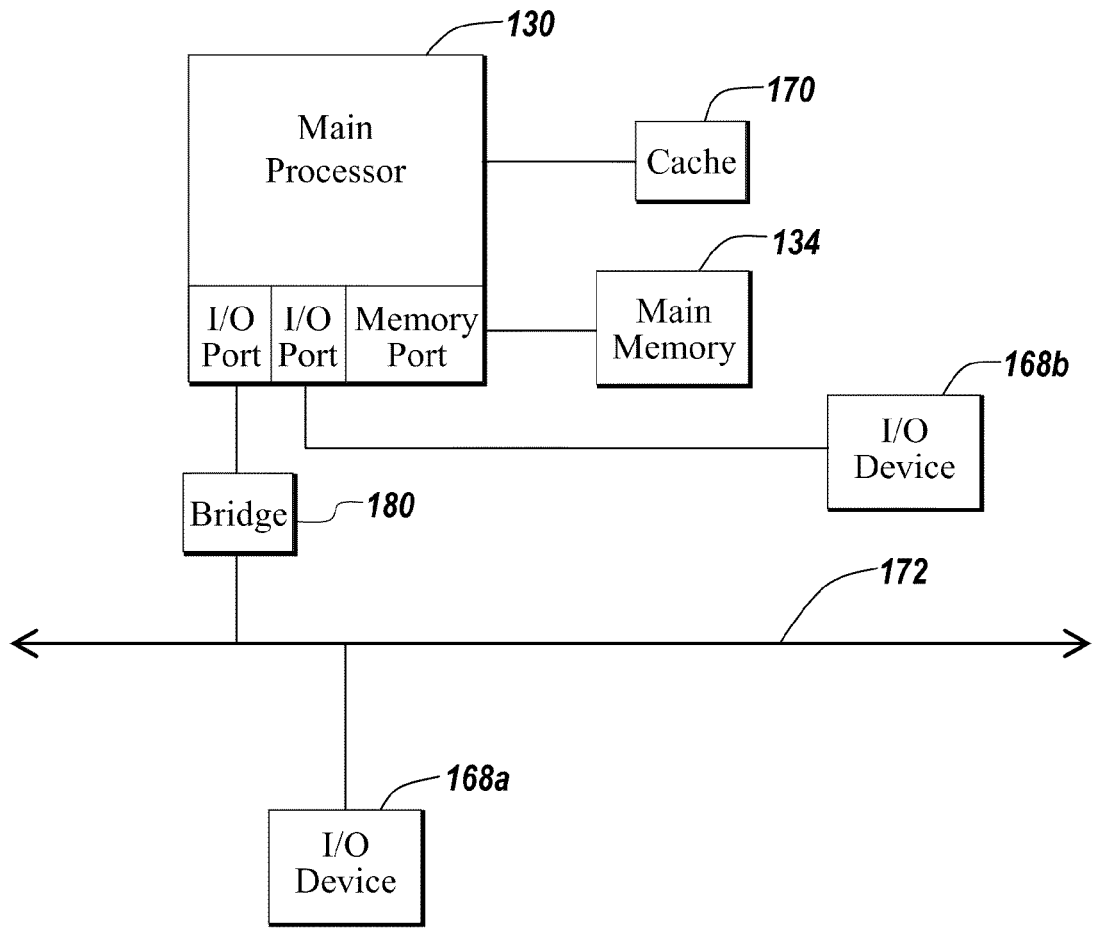
Figure 1E:
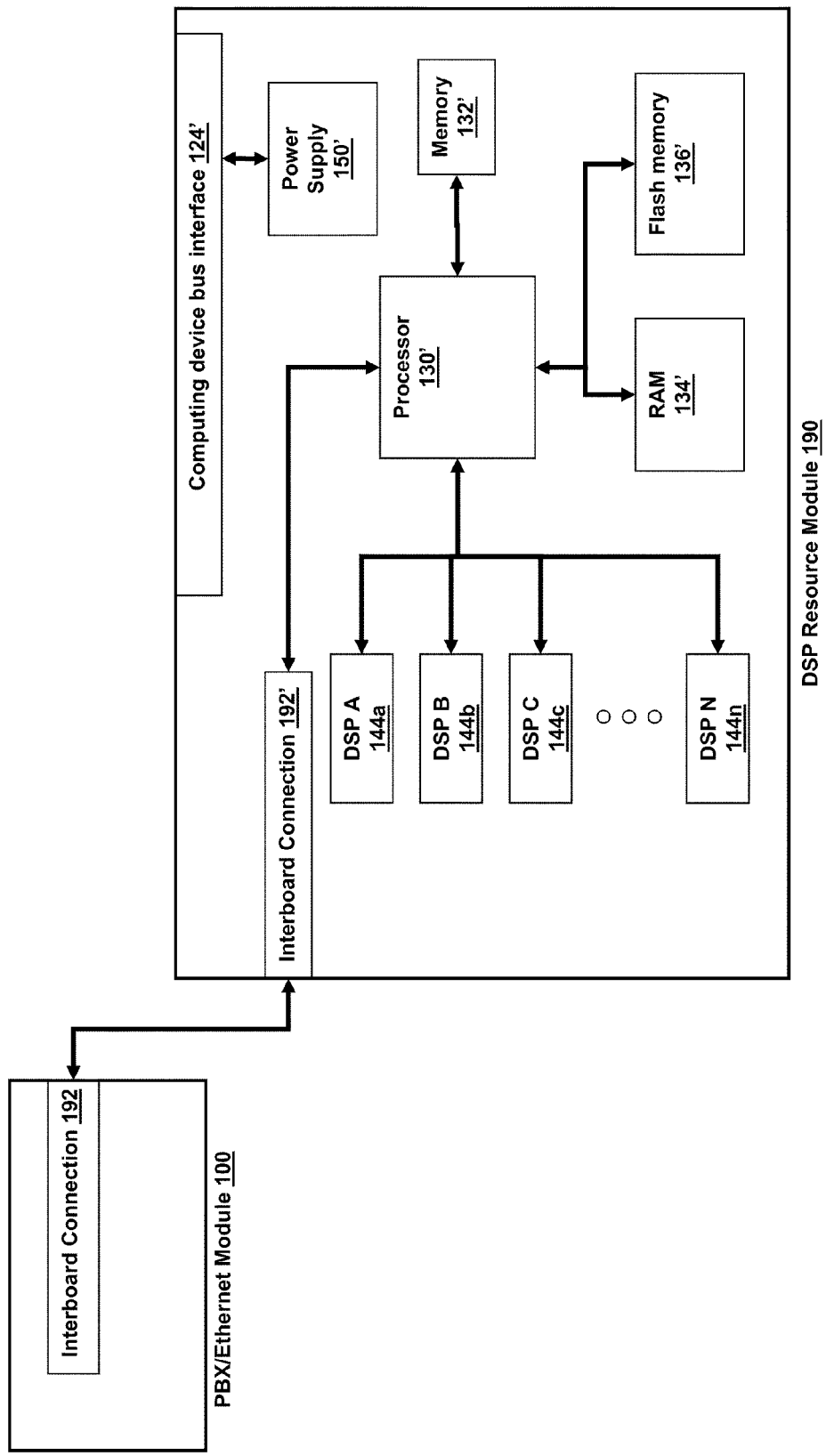
FIG. 1E is a block diagram of an embodiment of a DSP resource module.

Referring ahead to FIG. 1E, in a further embodiment, a PBX/Ethernet module 100 may include an interconnection 192 to a DSP resource module 190. DSP resource module 190 may be similar to a PBX/Ethernet module 100, and include a processor 130', memory 132', RAM 134', a flash memory interface 136', a bus interface 124', and a power supply 150'. A DSP resource module 190 may further comprise one or more DSPs 144a-144n and a connection 192' to PBX/Ethernet module 100. For example, a PBX/Ethernet module 100 may include a connector 192 for an application, such as a PBX proxy, executing on a coprocessor to connect to one or more DSPs 144a-144n on a DSP resource module 190 for additional processing capability. Thus, a DSP resource module 190 may provide expandability of a PBX/Ethernet system for reduced cost.

In some embodiments, connections between interboard connection 192 and 192' may be via a parallel or serial connector, such as a multi-wire planar cable, a flexible flat cable, an ISA, PCI, PCI-X or other type of bus, or any other interface for communication between two modules of a system.

FIGS. 1C and 1D depict block diagrams of a computing device 102 useful for practicing an embodiment of the computing device 102 of FIG. 1A, VOIP computers 114a-114b, VOIP provider 118, or any of the other computing devices shown in FIG. 1A. As shown in FIGS. 1C and 1D, each computing device 102 includes a central processing unit 130, and a main memory unit 134. As shown in FIG. 1C, a computing device 102 may include a visual display device 162, a keyboard 164 and/or a pointing device 166, such as a mouse. Each computing device 102 may also include additional optional elements, such as one or more input/output devices 168a-n (generally referred to using reference numeral 168), and a cache memory 170 in communication with the central processing unit 130.

The central processing unit 130 is any logic circuitry that responds to and processes instructions fetched from the main memory unit 134. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 102 may be based on any of these processors, or any other processor capable of operating as described herein.

Main memory unit 134 may be one or more memory chips capable of storing data and allowing any storage location to be directly accessed by the microprocessor 130, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 134 may be based on any of the above described memory chips, or any other available memory chips capable of operating as described herein. In the embodiment shown in FIG. 1C, the processor 130 communicates with main memory 134 via a system bus 172 (described in more detail below). FIG. 1D depicts an embodiment of a computing device 102 in which the processor communicates directly with main memory 134 via a memory port 174. For example, in FIG. 1F the main memory 134 may be DRDRAM.

FIG. 1D depicts an embodiment in which the main processor 130 communicates directly with cache memory 170 via a secondary bus, sometimes referred to as a backside bus. In other embodiments, the main processor 130 communicates with cache memory 170 using the system bus 172. Cache memory 140 typically has a faster response time than main memory 122 and is typically provided by SRAM, BSRAM, or EDRAM. In the embodiment shown in FIG. 1F, the processor 130 communicates with various I/O devices 168 via a local system bus 172. Various busses may be used to connect the central processing unit 130 to any of the I/O devices 168, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 162, the processor 130 may use an Advanced Graphics Port (AGP) to communicate with the display 162. FIG. 1D depicts an embodiment of a computer 102 in which the main processor 130 communicates directly with I/O device 168b via HyperTransport, Rapid I/O, or InfiniBand. FIG. 1D also depicts an embodiment in which local busses and direct communication are mixed: the processor 130 communicates with I/O device 168b using a local interconnect bus while communicating with I/O device 168a directly.

The computing device 102 may support any suitable installation device 174, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 176, or portion thereof. The computing device 102 may further comprise a storage device 132, such as one or more hard disk drives or redundant arrays of independent disks, for storing an operating system and other related software, and for storing application software programs such as any program related to the client agent 176. Optionally, any of the installation devices 174 could also be used as the storage device 132. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 102 may include a network interface or NIC 142 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The network interface 142 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. A wide variety of I/O devices 168a-168n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 168 may be controlled by an I/O controller 178 as shown in FIG. 1C. The I/O controller may control one or more I/O devices such as a keyboard 164 and a pointing device 166, e.g., a mouse or optical pen. Furthermore, an I/O device may also provide storage 132 and/or an installation medium 174 for the computing device 102. In still other embodiments, the computing device 102 may provide USB connections to receive handheld USB storage devices such as the USB Flash Drive line of devices manufactured by Twintech Industry, Inc. of Los Alamitos, Calif.

In some embodiments, the computing device 102 may comprise or be connected to multiple I/O devices 168a-168n or one or more display devices 162, which each may be of the same or different type and/or form. As such, any of the I/O devices 168a-168n and/or the display devices 162 or I/O controller 178 may comprise any type and/or form of suitable hardware, software, or combination of hardware and software to support, enable or provide for the connection and use of multiple I/O devices 168a-168n or display devices 162 by the computing device 102. For example, the computing device 102 may include any type and/or form of video adapter, video card, driver, and/or library to interface, communicate, connect or otherwise use the display devices 162. In one embodiment, a video adapter may comprise multiple connectors to interface to multiple display devices 162. In other embodiments, the computing device 102 may include multiple video adapters, with each video adapter connected to one or more of the display devices 162. In some embodiments, any portion of the operating system of the computing device 102 may be configured for using multiple display devices 162. In other embodiments, one or more of the display devices 162 may be provided by one or more other computing devices via a network.

In further embodiments, an I/O device 168 may be a bridge 180 between the system bus 172 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 102 of the sort depicted in FIGS. 1C and 1D typically operate under the control of operating systems, which control scheduling of tasks and access to system resources. The computing device 102 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Washington; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 102 may have different processors, operating systems, and input devices consistent with the device. For example, in one embodiment the computer 102 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 102 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2:
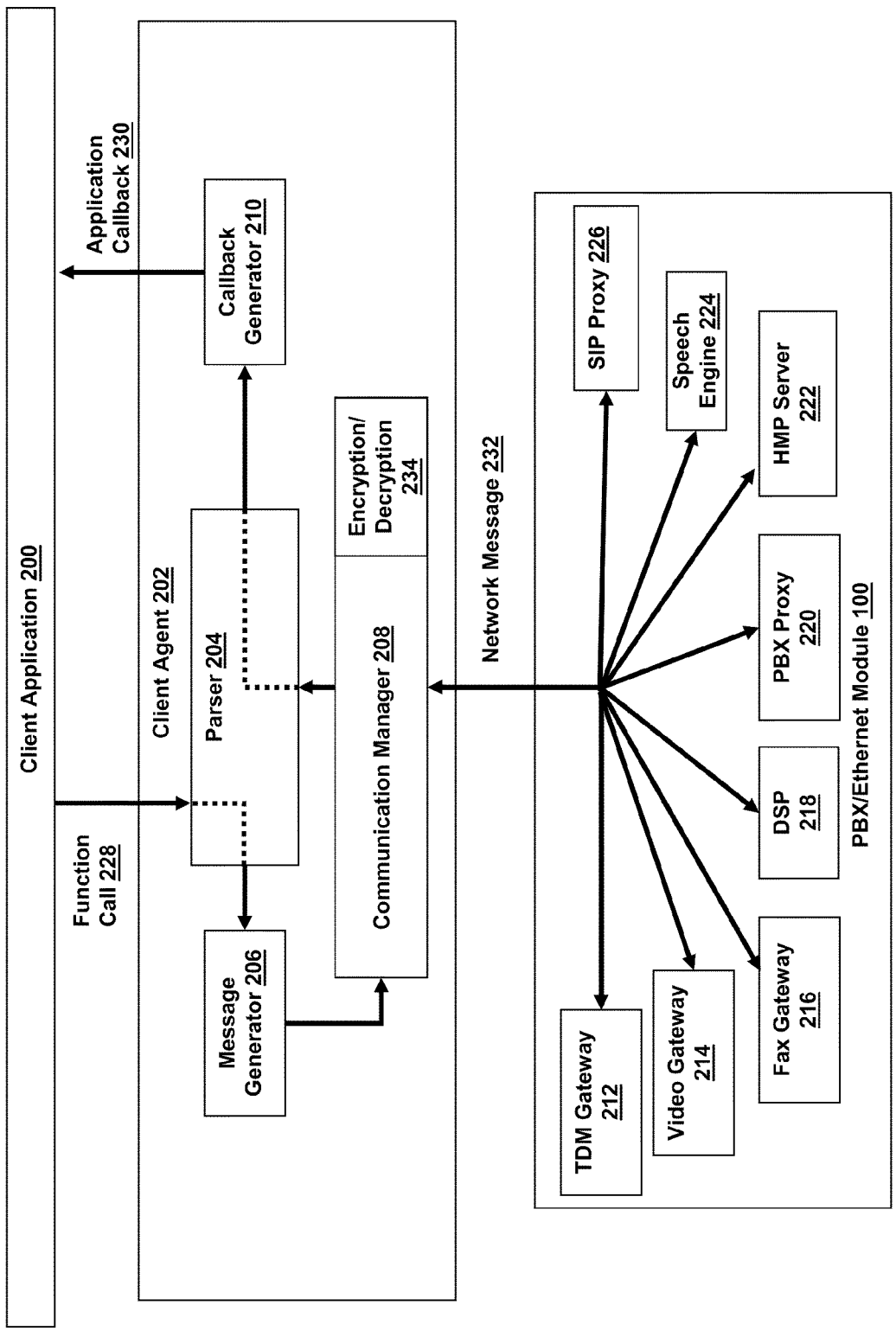
FIG. 2 is a block diagram of an embodiment of a system for communicating with an interface module for a mixed switched and IP telecommunications environment.

Referring now to FIG. 2, shown is a block diagram of an embodiment of a system for communicating with an interface module for a mixed switched and IP telecommunications environment. Briefly, a client application 200 communicates via a client agent 202 with a PBX/Ethernet module 100 by using function calls 228 and application callbacks 230. In some embodiments, client agent 202 may comprise a parser 204, a message generator 206, a communication manager 208, and a callback generator 210. In some embodiments, communication manager 208 may comprise an encryption/decryption module 234. Communication manager 202 may transmit and receive network messages 232 from various components of a PBX/Ethernet module 100, including a TDM gateway 212, a video gateway 214, a fax gateway 216, DSP 218, a PBX proxy 220, an HMP server 222, a speech engine 224, and an SIP proxy 226. In some embodiments, client agent 202 serves as an application programming interface for components of PBX/Ethernet module 100 to allow for easy and consistent programming by application developers.

Still referring to FIG. 2 and in more detail, a client application 200 may be executed by a computing device 102, VOIP computer 114, or any other computing device able to communicate via a network with PBX/Ethernet module 100. Client application 200 may comprise an application, a service, a routine, an executable program, a daemon, or any other type and form of executable instructions, such as instructions for interacting and controlling a communications module of PBX/Ethernet module 100. In many embodiments, client application 200 may comprise a web browser, a VOIP interface, a fax manager, a video teleconferencing interface, or other similar application.

Client agent 202 may comprise a service, a routine or subroutine, a function, an API, an executable program, a daemon, a run-time environment, a set of commands, or any other type and form of executable instructions, such as instructions for providing function calls and application callbacks to an application, and transmitting, receiving and interpreting network communications messages, such as via modules of a PBX/Ethernet module 100. In some embodiments, client agent 202 may receive a function call 228 from a client application, and parse the function call to generate a network message 232. Client agent 202 may transmit the network message via any type and form of network layer interface, such as a layer 2-4 interface via Ethernet, to PBX/Ethernet module 100. For example, the client agent may establish transport layer connections using sockets (e.g. layer 4 interfaces), such as via TCP over IP or UDP over IP. Client agent 202 may also receive a network message 232 from PBX/Ethernet module 100 and parse the message to generate an application callback 230, which may be passed to the application.

In many embodiments, a client application 200 may send functional calls and receive callbacks without being aware that a resource is non-local or accessed via a network. By separating the application from the network communication, application developers need not know about network protocols, communications sockets, handshaking procedures, message acknowledgements, and other features common to network communications. In some embodiments, an application may send a function call to a resource without specifying a network identifier or address of the resource, and the client agent may determine the identifier or address and generate a corresponding network communication as necessary. For example, the application may only need to know the name of the resource and not the IP address of the resource. In many embodiments, an application may use blocking function calls transmitted via client agent 202 over a network without tying up a network interface or preventing other applications from using the network interface.

In another aspect, the client agent makes a local non-LAN based API LAN and network aware but does so transparently and/or seamlessly to the application using the local non-LAN API layer. The client agent may seamlessly and transparently translate, convert or process a local procedural, imperative or functional API call of the application to one or more network reply and response messages using socket based communications such as TCP over IP or UDP over IP. In some aspects, even if the developer or application is aware that the client agent is performing network based communications and protocols, the developer and/or applications does not need knowledge of the mechanisms, protocols and interfaces for such network based communications.

Application providers are experts in their application areas such as voice processing, easy to use interfaces, call flow handling amongst others but may not necessarily be experts or knowledgeable on the behavior of networks that they run on. The client side API systems and method described herein allow application vendors and developed to focus on the application and use the power of an Ethernet based system to intercommunicate with many communications systems. This will allow application vendors and developed to focus on applications and yet have the power to have resources for trans-coding, termination and communications from numerous systems. In providing such a system the application vendors will not have to create a framework and communication protocol which will decrease their engineering budget requirements for their client/server applications which will also rapidly increase their time to market and reduce the risk in the development of the solution.

In some embodiments, client agent 202 may comprise a parser 204. A parser 204 may comprise a service, a routine or subroutine, a function, an executable program, a daemon, a set of commands, or any other type and form of executable instructions for interpreting function calls 228 and network messages 232. In some embodiments, a parser 204 may extract one or more functions, parameters and/or variables from a function call 228 and/or a network message 232. For example, a function call 228 may comprise a function indicating to start a new communication session with a resource, and variables indicating to login via an application name, a password, and an indication to use encryption. In another example, a function call 228 may comprise a function indicating to create a communications session between a VOIP client on a network and a PSTN circuit, and send a sequence of DTMF dialing tones on the PSTN circuit via a PBX module, and include variables of the DTMF tones. In another example, parser 204 may parse a network message 232 to identify a target application based on an IP address, port number, sequence number, or any other identification in a header or payload, and parse a payload of the message to identify an application callback to generate and one or more parameters to include in said callback.

A message generator 206 may comprise a service, a routine or subroutine, a function, an executable program, a daemon, a set of commands, or any other type and form of executable instructions for generating a network message responsive to parsed functions and variables in a function call 228. In some embodiments, a message generator 206 may comprise a table of resources and/or remote devices and corresponding network identifiers or addresses. In other embodiments, a message generator 206 may comprise functionality for determining a resource's network identifier through queries or domain identifiers. In some embodiments, a message generator 206 may create a network message having a header identifying a target resource or device's network address or identifier and having a payload comprising a function and/or parameters parsed from a functional call 228.

A communication manager 208 may comprise a service, a routine or subroutine, a function, an API, an executable program, a daemon, a run-time environment, a set of commands, or any other type and form of executable instructions for transmitting and receiving network messages 232. In some embodiments, a communication manager 208 may comprise a network driver or adapter, such as an Ethernet adapter. In some embodiments, a communication manager 208 may comprise or communicate with a hardware network interface, such as a NIC. In many embodiments, a communication manager 208 may comprise additional functionality for secure communications, including an encryption/decryption module 234. In these embodiments, a communication manager 208 may encrypt and decrypt communications using various encryption methods or algorithms. In some embodiments, a communication manager 208 further comprises functionality for compressing and decompressing communications.

A callback generator 210 may comprise a service, a routine or subroutine, a function, an executable program, a daemon, a set of commands, or any other type and form of executable instructions for generating an application callback 230 responsive to a received and parsed network message 232. In some embodiments, a callback generator 210 comprises a callback table or database, and generates application callbacks responsive to entries within the callback table. For example, in one such embodiment, a callback generator 210 may receive a parsed network message 232 indicating that an event, such as an incoming call, has occurred, along with variables or parameters, such as a call source and destination. The callback generator 210 may create a callback to a client application 200 in a predetermined format specified by the callback table and pass the callback to client application 200. In some embodiments, the predetermined formats specified by the callback table allow application developers to create applications with functions executed responsive to the various predetermined callbacks.

As shown in FIG. 2, network messages 232 may be transmitted to and received from various modules or components of a PBX/Ethernet module 100, including a time-domain multiplexing (TDM) gateway 212, a video gateway 214, a fax gateway 216, a digital signal processor 218, a private branch exchange proxy 220, a host media processing server 222, a speech engine 224, a session initiation protocol proxy 226, or any other component or module of a PBX/Ethernet module 100. In some embodiments, a communication may be directed to one of these modules by a network switch executing on PBX/Ethernet module 100, responsive to contents of a header and/or payload of the communication. For example, communications with a first destination port number may be directed to a TDM Gateway 212, while communications with a second destination port number may be directed to a PBX proxy 220. In another example, communications with a payload in a first application layer protocol may be directed to a video gateway 214, while communications with a payload in a second application layer protocol may be directed to a fax gateway.

Figure 3A:
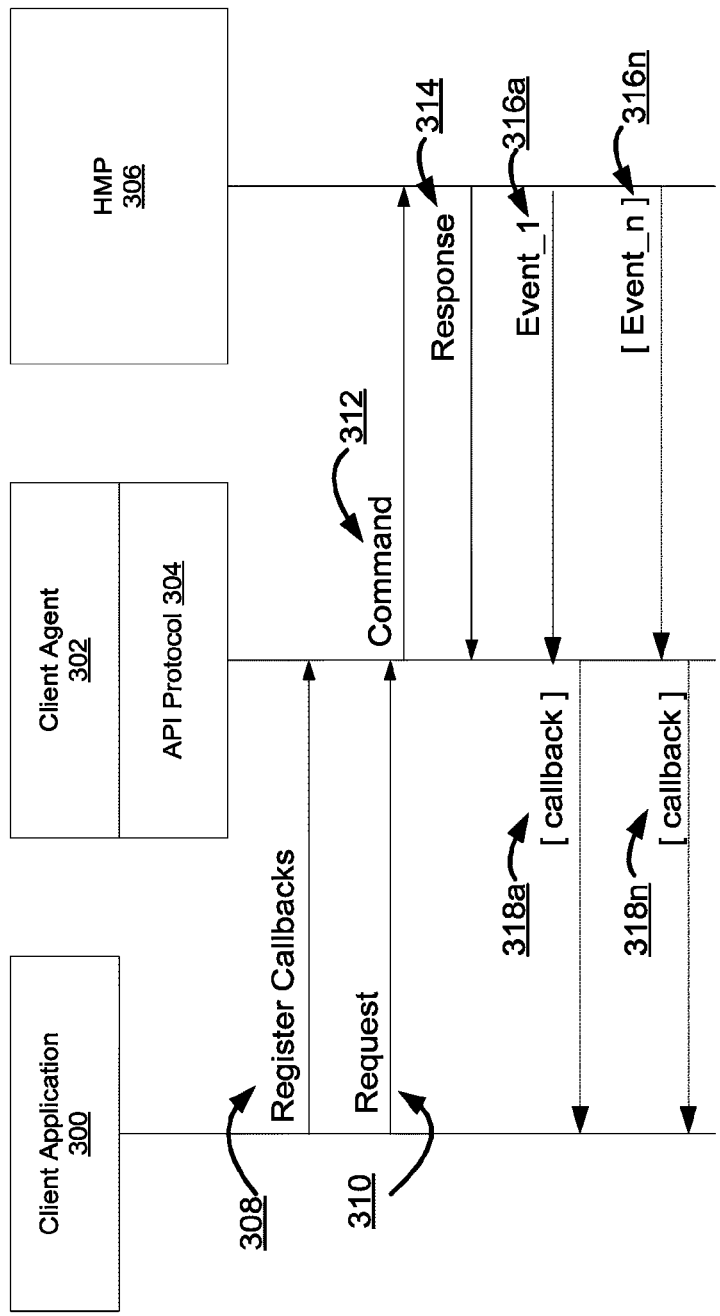
FIG. 3A is a signal flow diagram of an embodiment of an application programming interface (API) between a client application and a host media processing (HMP) system.

Shown in FIG. 3A is a signal flow diagram of an embodiment of a client agent utilizing an application programming interface (API) between a client application and a host media processing (HMP) system. Briefly, a client application 300 registers callbacks 308 with a client agent 302 using an API protocol 304. The client application 300 passes a request 310 to the client agent 302, which generates a command 312 and transmits the command 312 to an HMP 306. The HMP generates a response 314. HMP 306 generates one or more events 316a-316n and transmits them to the client API 302, which parses each event and generates an application callback 318a-318n. Many embodiments of API function call/callback interactions do not involve acknowledgements, unlike many network communication protocols. Similarly, many embodiments of API function call/callback interactions use blocking function calls, in which a client application stalls and waits for a response until a response is received, again unlike many network communications protocols. The client agent 302 thus serves as a translator between a blocking function call/callback interaction with an application and a network communication involving requests and acknowledgements with a remote device. In some embodiments, client agent 302 also serves as a multiplexer between multiple applications such that a network interface is not tied up by a blocking function call while waiting for a response from a remote device.

Still referring to FIG. 3A and in more detail, at 308, a client application 300 may register callbacks with a client agent 302 using an API protocol 304. Registering a callback allows an application to specify one or more callbacks 318 to be invoked in response to one or more events 316, and provide arguments for callback parameters.

As is shown in FIG. 3A, some responses from a remote device, such as a host media processing server 306 may be discarded rather than being translated into a callback 318 to client application 300. In some embodiments, discarded responses may include acknowledgements. For example, in a network communication involving a request/acknowledgement protocol such as TCP, a client may transmit a request to a remote device and the remote device may respond with an acknowledgement of the request being received. Because the acknowledgement only indicates receipt of the request, rather than a response to the content of the request, the acknowledgement may not be useful to a client application 300. Accordingly, the client agent 302 may discard the acknowledgement. In other embodiments, duplicate responses may be received, for example due to losses of acknowledgements that trigger retransmittals. In one such embodiment, duplicate responses may be discarded. Once appropriate processing or other functions have been performed, the remote device may transmit a response or an event to the client agent 302, which may generate appropriate callbacks for the client application 300.

In some embodiments, a command 312 may direct a remote device, such as a host media processor 306 to initiate various functions, such as a voice telephone call. Accordingly, once initiated, further communications may occur from the host media processor, such as an indication of a busy signal or a call being dropped or various other telephony events. Accordingly, events 316 may be generated and transmitted to the client. Client agent 302 may parse the events and generate appropriate callbacks 318 responsive to each event.

Figure 3B:
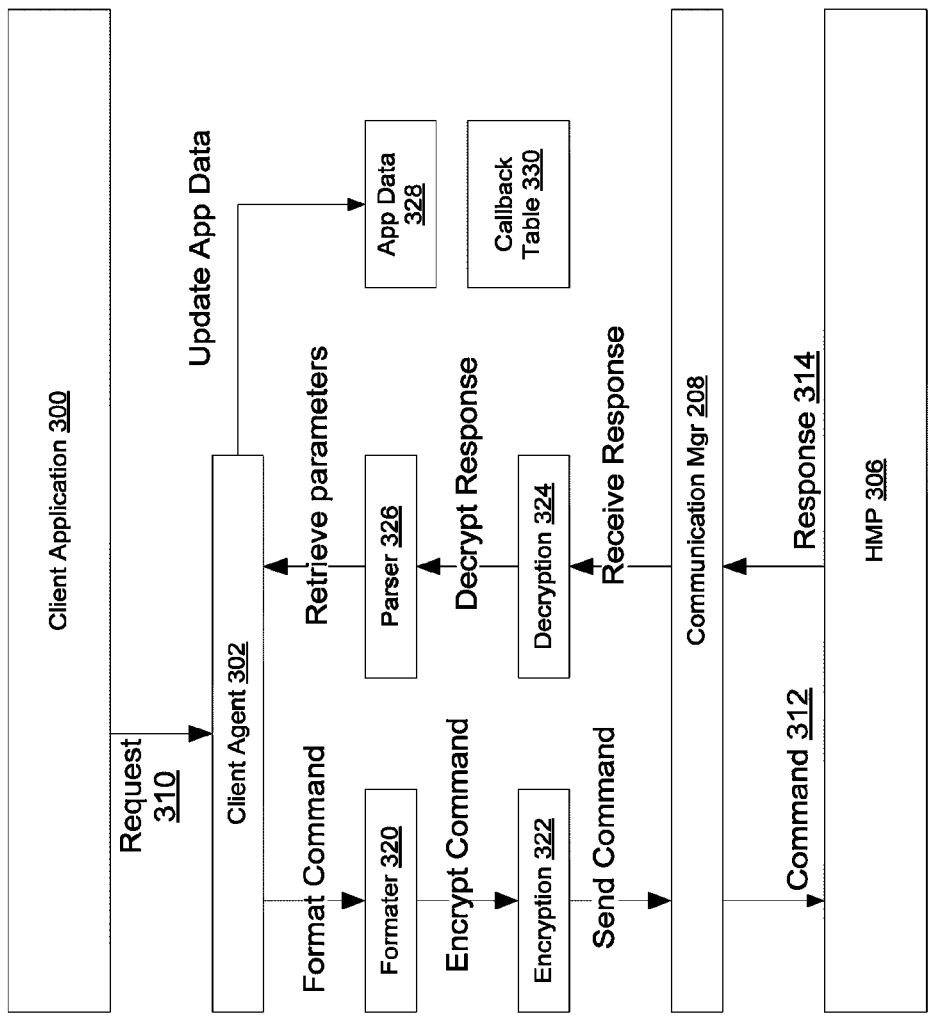
FIG. 3B is a block diagram of an embodiment of an API between a client application and an HMP system.

Shown in FIG. 3B is a block diagram of an embodiment of an API between a client application and an HMP system. In brief overview, a client application 300 passes a request 310 to a client agent 302. In some embodiments, a formatter 320 formats the command into a network message, and an encryption module 322 encrypts the command for secure transmittal. Communication manager 208 transmits the command 312 to an HMP system 306. HMP 306 transmits a response 314 which is received by communication manager 208. In some embodiments, the response is decrypted in a decryption module 324. A parser 326 retrieves parameters from the response. The client agent 302 may pass the parameters to the application 300 and/or update application data 328 and callback table 330.

Figure 3C:
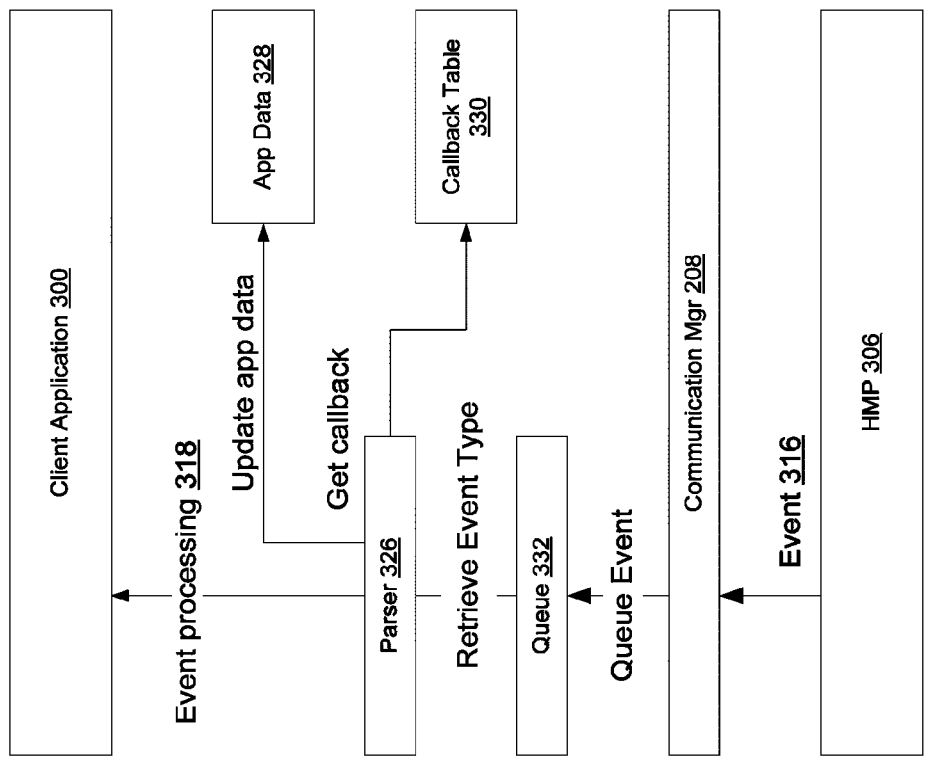
FIG. 3C is another block diagram of an embodiment of an API between a client application and an HMP system.

Referring ahead to FIG. 3C, another block diagram of an embodiment of an API between a client application and an HMP system is shown. Briefly, an HMP 306 sends an event 316 via a network communication to a communication manager 208, which queues the event as necessary in a queue 332. Parser 326 retrieves parameters of the event and updates application data 328. In some embodiments, using a callback table 330, the parser 326 generates an application callback 318 and passes the callback to the client application 300. FIG. 3B illustrates command/response flow, while FIG. 3C illustrates an independent queue for event processing. Utilizing independent queues allows for asynchronous event handling in a multi-threaded system.

Returning to FIG. 3B, a formatter 320 may comprise a service, a routine or subroutine, a function, an executable program, a daemon, a set of commands, or any other type and form of executable instructions for parsing and processing requests. In some embodiments, a formatter 320 may comprise functionality for mapping a request to a command, validating input parameters of the request, and/or generating a command message.

In some embodiments, network messages may optionally be encrypted 322 before transmission and decrypted 324 after receipt. This may be useful in embodiments in which command and configuration messages travel via a public network where a malicious attacker can intercept and regenerate commands. In some embodiments, network messages may be compressed and decompressed to reduce network bandwidth, if necessary.

A communication manager 208, as discussed above, may handle transmission and receipt, queuing, buffering, and other functionality as necessary or desired for processing network communications between the client and a remote device or module. Once received, responses 314 are decrypted and/or decompressed, and passed to parser 326. As discussed above as parser 204 of FIG. 2, a parser comprises functionality for extracting arguments and parameters from a response 314. In some embodiments, parser 326 updates application data 328 responsive to the parameters in response 314. Application data 328 may comprise a local mirror of host media processing data related to resources used by client application 300. In many embodiments, parser 326 generates a callback or modifies an entry in a callback table 330 responsive to parameters in response 314.

Returning to FIG. 3C, events may be generated by a remote device such as HMP 306 and notifications of an event 316 may be transmitted via a network communication. Where a blocking function call will stall an application until a response is received such that only one function call and response are communicated between an application and remote device at a time, multiple events may be sent by the remote device within a short time period. Thus, to allow for processing of events in order, in some embodiments, a queue 332 may be used to hold messages until a parser 326 is available to process the event message. In one embodiment, processing an event message may comprise extracting parameters and arguments from the payload of a network message, the parameters and arguments identifying an event and/or additional details of the event. In some embodiments, retrieving a corresponding callback from callback table 330 that was registered by the client application 300 for the event. In some embodiments, parser 326 may update application data 328 responsive to parameters of the event. In many embodiments, parser 326 may pass the retrieved application callback, including any parameters of the event message, to the client application 300.

Figure 4A:
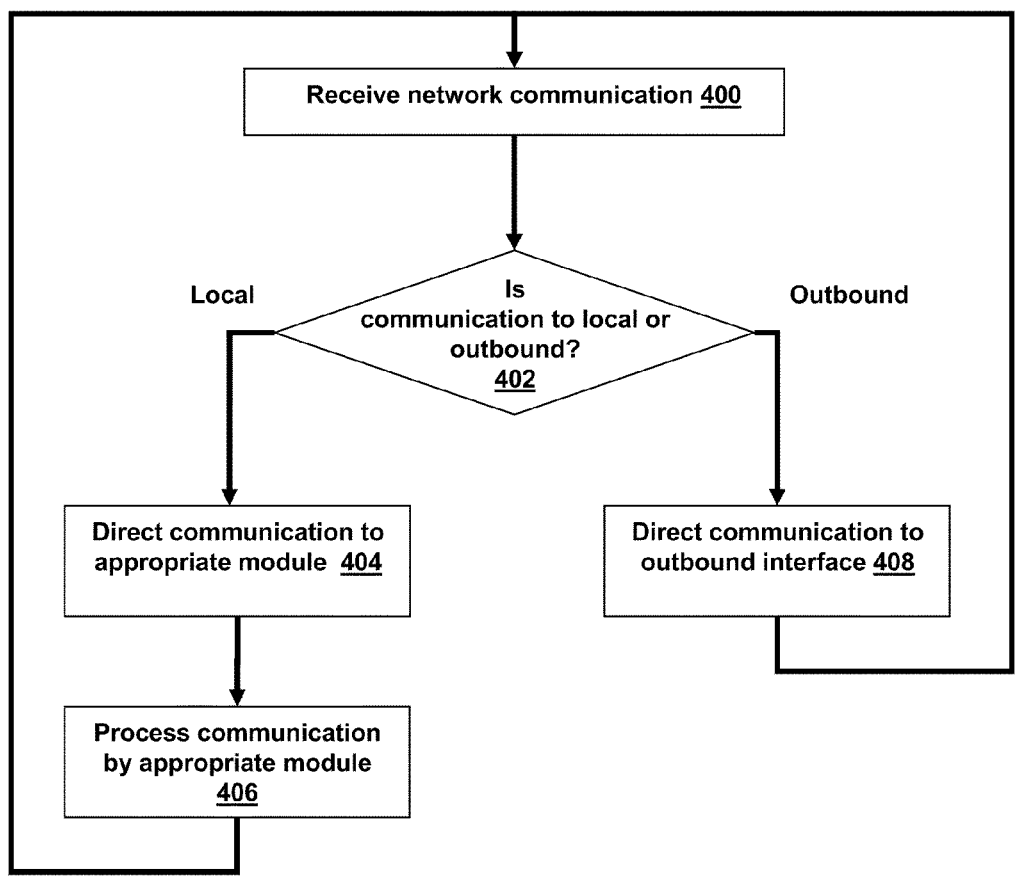
FIG. 4A is a flow chart of an embodiment of a method for accessing private branch exchange services via a single integrated device installed as an Ethernet adapter on a computing device.

FIG. 4A is a flow chart of an embodiment of a method for accessing private branch exchange services via a single integrated device installed as an Ethernet adapter on a computing device. In brief overview, at step 400, a PBX/Ethernet module may receive a network communication. A network switch of the module may determine, at step 402, if the communication is directed to a local component or application executing on the module, or outbound to the network. If the communication is local, then at step 404, the switch may direct the communication to a target component. At step 406, the target component may process the communication. If the communication is directed outbound to the network, then at step 408, the switch may direct the communication to an outbound interface.

Still referring to FIG. 4A and in more detail, at step 400, a PBX/Ethernet module may receive a network communication. In one embodiment, the PBX/Ethernet module may receive a network communication from a host computing device via a bus interface. In one embodiment in which the PBX/Ethernet module is serving as a network adapter for the host computing device, the network communication may be an application layer, presentation layer, or session layer communication via an API or other interface. In a further embodiment, the PBX/Ethernet module may add transport layer and/or network layer headers to the communication to allow the message to be transmitted via a network. In another embodiment, the PBX/Ethernet module may receive the network communication via a network interface.

At step 402, an Ethernet switch of the PBX/Ethernet module may determine if the communication is directed locally to a component or module of the PBX/Ethernet module, or directed outbound. As used herein, outbound refers to a destination external to PBX/Ethernet module, but such destination may be on a network connected to a network port of the PBX/Ethernet module, or may be a host computing device connected to a bus interface of the PBX/Ethernet module. Thus, in an embodiment in which the PBX/Ethernet module is serving as a network adapter for a host computing device, a communication received by the PBX/Ethernet module from another network device and redirected to the host computing device may be considered to be redirected outbound to the host computing device. In some embodiments, a determination of whether the communication is directed locally or directed outbound may be responsive to a destination IP address or port number of the communication. In another embodiment, the determination may be made responsive to a protocol of the communication. In one such embodiment, a communication may be directed outbound if it includes a payload in a protocol that the PBX/Ethernet module does not use. For example, if the PBX/Ethernet module is not executing a mail server, then a determination may be made that a communication with an IMAP or POP protocol payload is directed outbound.

At step 404, the switch may direct the communication to an appropriate module or component of the PBX/Ethernet module, such as a PBX application or an HMP application, a speech engine or a DSP resource, a processor or co-processor, a web server, a SIP proxy, or any other module or component of the PBX/Ethernet module, as described above. In some embodiments, the switch may direct the communication responsive to a characteristic of the communication, such as a port number or protocol of the communication.

At step 406, the module or component may process the communication. In many embodiments, processing the communication is responsive to the contents of the communication, such as a request or query. In some embodiments, processing the communication by a module or component may comprise executing a function of said module or component. For example, a PBX application may process the network communication to provide a PBX function, or an HMP application may provide an HMP function on a payload of a communication. In other embodiments, processing the communication may comprise modifying or reconfiguring the module or component. For example, a communication may change a compression parameter of a DSP resource, such that the DSP resource processes an audio or video signal differently. In some embodiments, processing the communication may comprise generating a response to the communication and sending the response to the switch.

If at step 402, the switch determines that the communication is not directed to a local component or module of the PBX/Ethernet module, then at step 408, the switch may direct the communication to an outbound interface. In some embodiments where the communication is received from a network interface of the PBX/Ethernet module, directing the communication to an outbound interface may comprise directing the communication to a bus interface. In other embodiments where the communication is received from a bus interface of the PBX/Ethernet module, directing the communication to an outbound interface may comprise directing the communication to a network interface. In still other embodiments where the communication is received from a local module or component of the PBX/Ethernet module, then directing the communication to an outbound interface may comprise directing the communication to either a network interface, a bus interface, or both a network interface and a bus interface, responsive to a header and/or a payload of the communication. For example, a broadcast communication may be sent to both interfaces.

Figure 4B:
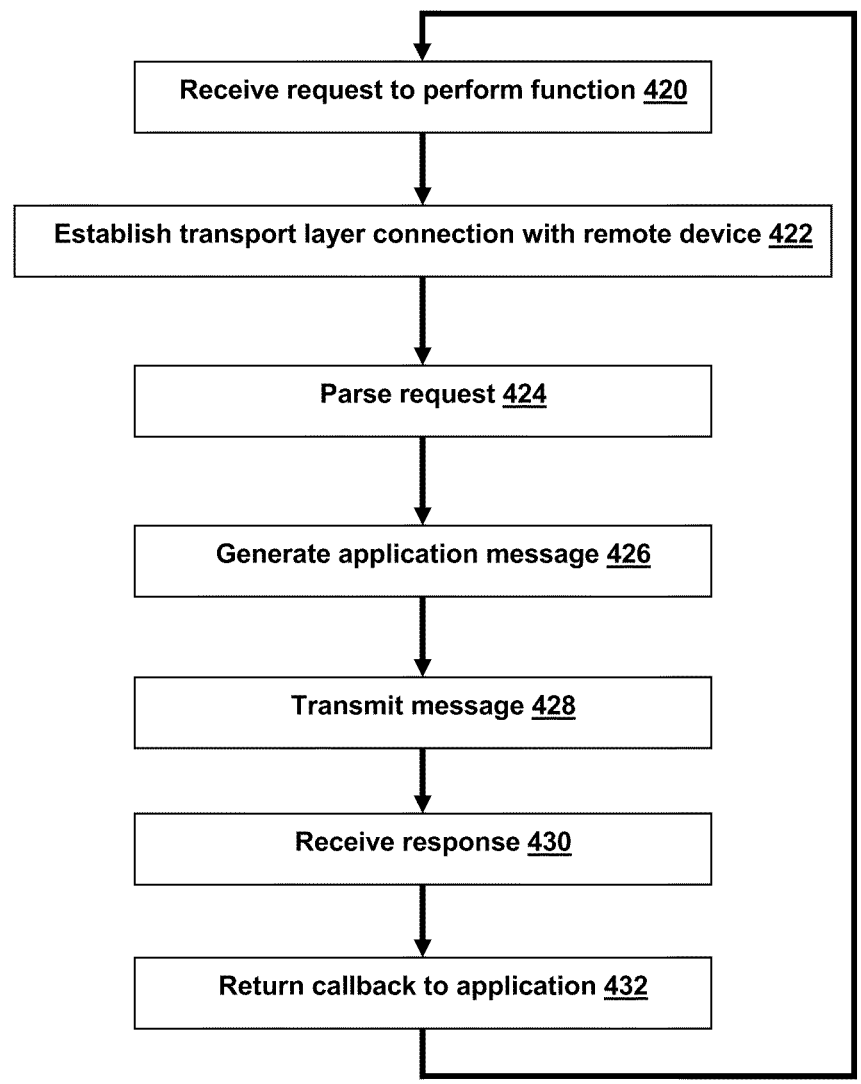
FIG. 4B is a flow chart of an embodiment of a method for providing a client-side application programming interface to access a networked telecommunication resource.

Shown in FIG. 4B is a flow chart of an embodiment of a method for providing a client-side application programming interface to access a networked telecommunication resource. Briefly, at step 420, a client agent may receive a request from an application to perform a function. At step 422, the client agent may establish a transport layer connection with a remote device. At step 424, the client agent may parse the request, and at step 426, the client agent may generate an application message. The client agent may transmit the message at step 428. In some embodiments, the client agent may receive a response from the remote device at step 430, and may return a callback to the application at step 432.

Referring to FIG. 4B and in more detail, at step 420, a client agent may receive a request from an application to perform a function. In some embodiments, the client agent may receive a request via a local application interface call. In many embodiments, the client agent may receive a blocking API call. In some embodiments, the request to perform a function may be a request to perform a function via a telecommunication resource. However, in a further embodiment, the request to perform a function via the telecommunication resource may not identify the location of the resource, or even indicate that the resource is not local to the client. For example, in one such embodiment, an application may pass a blocking call to the client agent to execute a PBX function, but the call may not identify that the PBX function is to be performed by a PBX/Ethernet module accessible via a network connection. In many embodiments, the application may not be network aware, or may be agnostic to a network.

At step 422, in some embodiments, the client agent may establish a transport layer connection with a remote device. In some embodiments, the client agent may utilize an already established transport layer connection, while in other embodiments, the client agent may establish a new transport layer connection. In many embodiments in which the request received at step 422 does not identify a resource by location, the client agent may determine a network identifier, such as an IP address and port, of the resource. In one embodiment, the client agent maintains a configuration, such as a file, table or database, of network identifiers of one or more resources. In some embodiments, establishing a transport layer connection may comprise performing a handshake routine, such as the three-way handshake of the TCP protocol.

Furthermore, although referred to as a remote device, in some embodiments, the remote device may be a module of a PBX/Ethernet module installed in a computing device as discussed above. Thus, establishing a transport layer connection with a remote device may comprise establishing a transport layer connection between a computing device and a PBX/Ethernet module installed to a bus of the computing device. For example, if the computing device is executing the client agent, the PBX/Ethernet module may still be considered to be a "remote" device, in spite of being installed as an Ethernet adapter in the computing device. Accordingly, one of ordinary skill in the art may understand that "remote" should not be read as implying geographical distance, or even network distance, but rather that a remote device is a device accessible to the client agent via a network connection.

At step 424, the client agent may parse the received request. In some embodiments, parsing the request may comprise determining a requested resource from the request. Although illustrated as after step 422, in many embodiments, step 424 may be performed prior to step 422. For example, in one embodiment, a client agent may receive a request and parse the request to determine a target resource of the request. The client agent may then establish a transport layer connection with the target resource.

At step 426, in some embodiments, the client agent may generate an application message corresponding to the local application interface call. In one embodiment, generating the application message may comprise creating a header and payload of a network message, with the header identifying a network identifier of a target resource, and a payload comprising the request in a format and/or protocol useable by the target resource. In one embodiment, generating the application message may comprise generating an ASCII message from parameters of the local API call. In some embodiments, generating the application message may comprise performing additional processing on the payload of the message, including compression and/or encryption. For example, in one such embodiment, the client agent may receive an API call with a request to modify parameters of a resource. The client agent may determine the network identifier of the resource and extract the parameters from the API call. The client agent may generate a network communication to an IP address and port number of the resource, with an encrypted payload comprising the extracted parameters of the request, for secure transmission over a public network.

At step 428, the client agent may transmit the generated message to the remote device or resource over the transport layer connection. In some embodiments, transmitting the generated message may comprise transmitting the application message via a telecommunications protocol over the transport layer connection to the remote device. For example, in one such embodiment, the message may be transmitted via an SIP or TCP protocol.

At step 430, the client agent may receive a response from the remote device or resource via the network. In some embodiments, the client agent may receive the response with an encrypted and/or compressed payload. In a further embodiment, the client agent may decrypt and/or decompress the payload.

At step 432, the client agent may return a local application interface call based on the response to the client application. In one embodiment, the client agent may parse the payload of the response to extract parameters sent responsive to the request. In a further embodiment, the client agent may generate the local application interface call or callback based on the extracted parameters. In some embodiments, the client agent may generate the call based on a callback table that identifies a callback for a request, and include parameters extracted from the payload of the response. In some embodiments, in which a plurality of client applications interact with the client agent concurrently to transmit API requests, the client agent may parse the header and/or payload of the response to identify the client application that initiated the request corresponding to the response.

Although not illustrated, in some embodiments, the client agent may receive one or more network communications or packets transmitted by the remote device or resource. In these embodiments, the client agent may generate corresponding application or event calls based on event parameters in the payload of the one or more network communications and pass the application or event calls to the client application.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for providing a client-side application programming interface to access a networked telecommunication resource, the method comprising:
    (a) receiving, by an agent executing on a client device, via a local application interface call from a client application a request to perform a function via a telecommunication resource;
    (b) establishing, by the agent, a transport layer connection via a network to the remote device identified by the agent as providing the telecommunication resource;
    (c) generating, by the agent, an application message corresponding to the local application interface call;
    (d) transmitting, by the agent, the application message over the transport layer connection via the network to the remote device;
    (e) receiving, by the agent, a response to the application message via the network from the telecommunication resource of the remote device; and
    (f) returning, by the agent, a result to the local application interface call based on the response.

2. The method of claim 1, wherein step (a) further comprises receiving, by the agent, a local API call from a client application that is not network aware.

3. The method of claim 1, wherein step (b) further comprises determining, by the agent, a network identifier for the telecommunication resource identified by the local application interface call.

4. The method of claim 1, wherein step (c) further comprises generating for the application message an ASCII message from parameters of the local API call.

5. The method of claim 1, wherein step (c) further comprises encrypting, by the agent, the application message.

6. The method of claim 1, wherein step (d) further comprises transmitting, by the agent, the application message via a telecommunications protocol over the transport layer connection to the remote device.

7. The method of claim 1, wherein step (e) further comprises parsing, by the agent, an application layer payload of the response to extract parameters.

8. The method of claim 1, wherein step (e) further comprises decompressing, by the agent, an application layer payload of the response.

9. The method of claim 1, wherein step (f) further comprises determining, by the agent, from content of an application layer payload of the response the result to return to the local API call.

10. The method of claim 1, further comprising receiving, by the agent, an event via application layer data from one or more packets transmitted by the remote device to the agent.

11. The method of claim 1, further comprising transmitting by the agent the application message and receiving the response via the network transparently to the client application.

12. A system for providing a client-side application programming interface to a telecommunication resource, the system comprising:
    an agent executing on a client device receiving, via a local application interface call from a client application, a request to perform a function via a telecommunication resource;
    a formatter of the agent formatting an application message corresponding to the local application interface call;
    a communications manager of the agent establishing a transport layer connection via a network to the remote device identified by the agent as providing the telecommunication resource and transmitting the application message over the transport layer connection via the network to the remote device,
        wherein the communications manager receives a response to the application message via the network from the telecommunication resource of the remote device; and
    a parser of the agent parsing the response received from the communication manager,
        wherein the agent returns a result to the local application interface call based on the parsed response.

13. The system of claim 12, wherein responsive to a plurality of local API calls, the agent, transparently to the client application, transmits requests to one or more telecommunication resources over the network and receives responses over the network from the one or more telecommunication resources.

14. The system of claim 12, wherein the communications manager determines a network identifier for the telecommunication resource identified for the local application interface call.

15. The system of claim 12, wherein the formatter generates for the application message an ASCII message from parameters of the local API call.

16. The system of claim 12, wherein an encryptor of the agent encrypts the application message.

17. The system of claim 12, wherein a protocol manager transmits via the communications manager the application message via a telecommunications protocol over the transport layer connection to the remote device.

18. The system of claim 12, wherein the parser parses an application layer payload of the response to extract parameters.

19. The system of claim 12, wherein a decryptor decompresses an application layer payload of the response.

20. The system of claim 12, wherein a protocol manager determines from content of an application layer payload of the response the result to return to the local API call.

21. The system of claim 12, further comprising an events manager receiving from the communications manager an event via application layer data of one or more packets transmitted by the remote device and responsive to the event, the events manager executing one or more callbacks registered for the event.

\* \* \* \* \*